Jan. 4, 1966  H. PERRIN  3,226,809
METHOD OF MANUFACTURING WORM-AND-NUT DEVICES
Filed Aug. 17, 1962
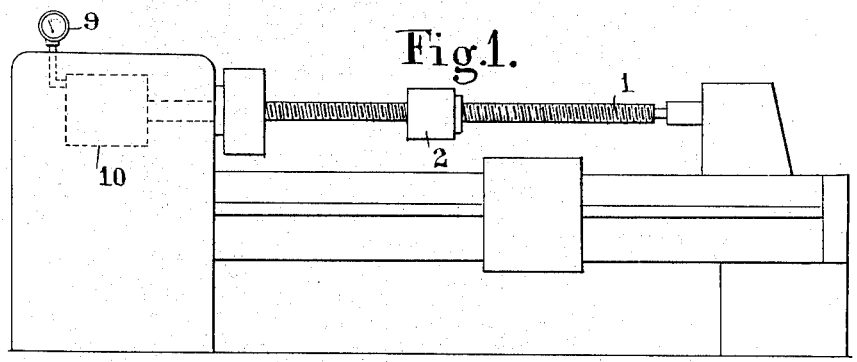
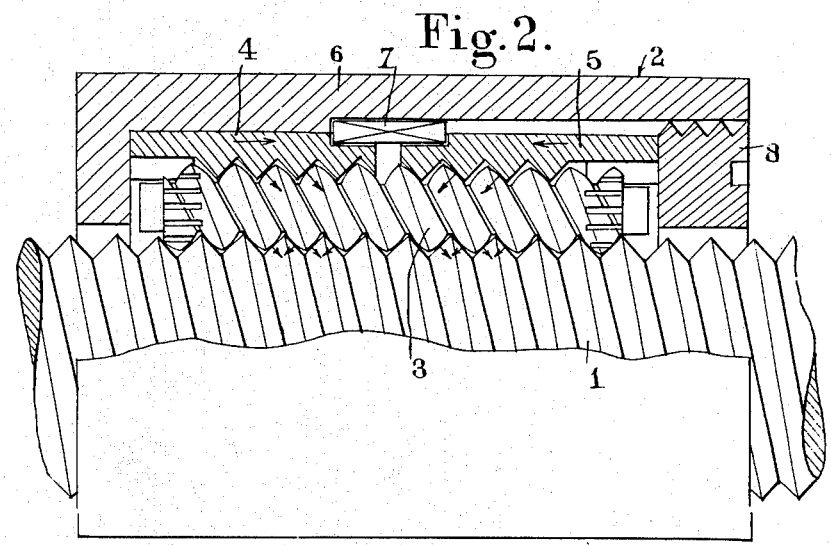
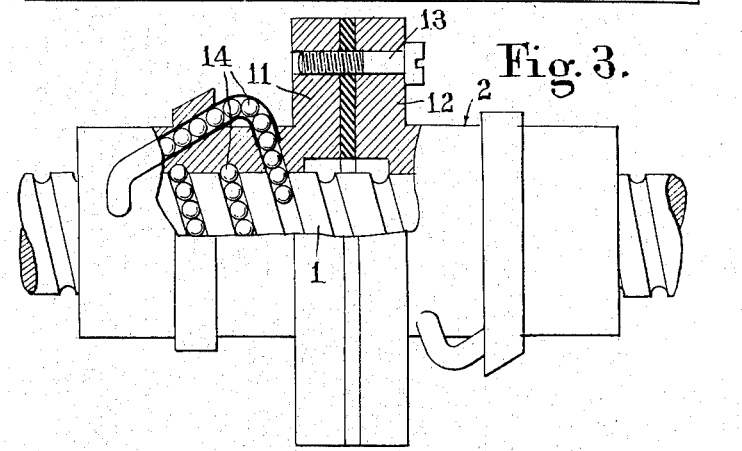
INVENTOR
HERVÉ PERRIN
Amster & Levy
ATTORNEYS

United States Patent Office 3,226,809
Patented Jan. 4, 1966

3,226,809
METHOD OF MANUFACTURING WORM-AND-NUT DEVICES
Hervé Perrin, Neuilly-sur-Seine, France, assignor to the Technique Integrale, Societe Anonyme, Paris, France
Filed Aug. 17, 1962, Ser. No. 217,679
2 Claims. (Cl. 29—159.2)

The present invention relates in general to a method of manufacturing worm-and-nut devices designed for transforming a movement of rotation into a movement of translation (or vice versa), wherein the worm threads engage one or more members adapted to transform the greater part of the sliding frictional contacts into rolling frictional contacts in order to improve the efficiency of the device.

Up to now, various high-efficiency worm-and-nut devices of this general type have been proposed, wherein most sliding frictional contacts are replaced by rolling frictional contacts. Thus, three main systems of this character are used in various fields, namely:

(1) The so-called recirculating ball screw system, or crossed-roller system, wherein intermediate balls or rollers are in constant rolling engagement with the worm threads and the nut threads, so that these balls or rollers are also moved longitudinally with respect to the nut;

(2) The roller-type worm-and-nut devices wherein rollers are caused to roll on the worm threads, the effort of translation being transmitted by the ends of these rollers;

(3) The so-called "helical bearing" systems wherein planet-like rollers formed with external, special-shaped threads are in rolling engagement simultaneously with the worm threads and with the nut threads without undergoing any axial displacement with respect to the nut, the stress being transmitted from the side faces of the screw threads to those of the satellite or planet rollers, and from the side faces of the roller threads to those of the nut threads.

Modern machining methods currently afford a high degree of precision in the manufacture and finishing of all the component elements of the device (balls, plain and threaded rollers, worm threads, etc.), but the problem is more complicated when it is desired to use devices incorporating screws or worms of relatively great length, wherein the pitch precision should be kept as strictly constant as possible, the mechanical strength and surface hardness of the thread faces being sufficient to reduce rolling friction to a minimum.

In these various devices the members rolling on the worm threads (balls, plain rollers, threaded rollers, etc.) have the smallest radii of curvature at the points of contact (in comparison with those of the worm and nut); therefore, a Vickers hardness number $\geqslant 650$ should be obtained for these various elements for most applications.

On the other hand, the worm might admit a lower hardness number but nevertheless the outer layer of its threads must have a sufficient resistance to wear by rolling frictional contact. The distribution of the points of contact during the operation of the device depends on the regularity of the screw threads. Therefore, in practice a proper distribution would involve a number of points of contact substantially equal to the theoretical number and the feed per revolution would be inasmuch accurate as the points of contact on the worm threads are more regularly distributed according to the kinematic principles on which the selected device is based.

It is the object of this invention to provide, through a proper selection of the alloys and methods of manufacture, a high-efficiency worm-and-nut device having a high resistance to wear and shocks in conjunction with a constant precision while permitting a simple worm construction.

It is another object of this invention to provide a method of manufacturing a worm-and-nut device, wherein the worm threads contact one or more members such as balls, rollers, threaded rollers, which members are adapted to transform the greater part of the sliding frictional contact into rolling contact, this method being remarkable notably in that the worm is made of an air-quenched steel, and that after machining said worm the latter is burnished by cold-working the worm threads by causing to circulate over its whole length a nut assembly with controlled play, locked under a slight amount of prestress.

Preferably, the worm is made from Ni-Cr-Mo work-hardening steel treated to have a Vickers hardness test number such as $420 \leqslant HV \leqslant 460$, and the worm engaging members (i.e., balls, plain or threaded rollers) are made from a steel having a Vickers number $HV \geqslant 650$.

Due to the cold-rolling properties of the worm steel the resistance to wear of the device is equivalent to that of devices wherein the worms are manufactured from steels having a higher initial hardness number and the other hand the worm-and-nut device obtained with the method of this invention is remarkable in that pitch errors or differences due to turning operations are reduced by the regularization resulting from this final thread shaping step.

In order to afford a clearer understanding of this invention and of the manner in which the same may be carried out in practice, reference will now be made to the accompanying drawing illustrating diagrammatically by way of example typical embodiments of the invention. In the drawing:

FIGURE 1 is a diagram showing a lathe in which the burnishing operation of the method of this invention is being carried out;

FIGURE 2 is a fragmentary longitudinal section showing an adjustable-play nut assembly for a helical bearing; and FIGURE 3 is an elevational and part-sectional view showing a ball nut with play adjustment means.

The first operation of the method of manufacture according to this invention, given by way of example only, consists in selecting a steel screw having a composition in the following range C=0.30 to 0.45%
Ni=3.70 to 4.30%
Cr=1.20 to 1.50%
Mo=0.35 to 0.60%
Mn=0.15 to 0.55%
Si=0.10 to 0.40%
C=0.40%
Ni=4.20%
Cr=1.50%
Mo=0.60%
Mn=0.20%
Si=0.20%

The rolling element of the screw consists for example of SAE 52 100 steel treated to give a Vickers hardness number $\geqslant 720$.

After turning the screw to its cylindrical contour it is treated by hardening and tempering to obtain a Vickers hardness number $420 \leqslant HV \leqslant 460$, according to the ovens and salt baths available. The treatment may consist either of an air hardening operation after austenitization at 875°–900° C., followed by a tempering at 500°–520° C., or of an isothermic hardening operation followed by a cold treatment and subsequent tempering at 500°–520° C. Then the screw threads are machined with specially shaped "comb" tools of high-speed supercarbide steel having a Rockwell "C" scale hardness number such as $67 \leqslant RC \leqslant 70$. The dimensions of the screw thus machined should be those contemplated for the minimum initial play in operation. The screw 1 (FIG. 1) having been threaded on a lathe throughout its length, the special nut or socket 2 with controlled play is mounted with a slight degree of prestress on the screw.

The nut assembly 2 with controlled play may consist for example of the structure illustrated in FIGS. 2 and 3 of the drawing.

In FIG. 2 the play adjustment nut comprises a plurality of threaded planet rollers 3 having a curvilinear convex thread contour, which are mounted in a pair of internally threaded shells 4, 5 housed in an outer coaxial case 6. These shells 4, 5 are connected to the case 6 by means of a longitudinal key 7 and pressed against each other by a prestress adjustment nut 8. FIG. 2 illustrates the forces applied to the shells 4, 5 as a consequence of the the prestress exerted by the nut 8 and of its transmission to the threads of screw 1. The stress exerted on the screw threads 1 produce a cold-hardening thereof.

In FIG. 3 the assembly nut 2 with controlled play comprises two ball screw nuts 11, 12 assembled by means of bolts 13 whereby the degree of prestress may be adjusted at will. Balls 14 circulating in a manner known per se in the nuts 11, 12 and in the threads of screw 1 transmit to the side faces of the screw threads the stress resulting from the prestressed nuts 11, 12, thus causing the cold-hardening of these threads, as in the case of FIG. 2.

It would not constitute a departure from the present invention to substitute two internally threaded sockets transmitting the effort through the ends of intermediate threaded rollers for the pair of ball nuts 11, 12.

After having mounted the nut assembly 2 with controlled play on the screw 1 (FIG. 2) the former is caused to circulate throughout the length of the latter. The velocity of rotation of screw 1 ranges from 80 to 120 r.p.m. and the operation requires from five to ten passes in the presence of flowers of sulfur. To check the regularity of the motion, an ammeter 9 is used to show the value of the current strength energizing the motor 10 driving the screw for the burnishing operation with the prestress load alone. When the current strength remains constant throughout the stroke, the burnishing may be regarded as uniform and completed. The screw is made from a steel alloy such that it is possible to cold-harden the flanks of the screw threads such as to increase the surface hardness of the race from 100 to 150 Vickers hardness number and to ensure a high degree of wear resistance due to the precipitation of the chromium carbide while affording a surface condition yielding rolling contacts with the intermediate members which are comparable with those of the best thrust ball-bearings.

Due to this slight "rolling" of the screw threads the points of contact between the screw threads and the intermediate elements of the nut are properly distributed. In fact, these elements have been machined beforehand with the highest precision according to the methods and the industrial equipments best suited to give the requisite properties to the balls, threaded sockets, rollers, threaded planet rollers, etc.

Therefore, the number of points of contact may become equal to the maximum number theoretically calculated when studying the device, thus improving the resistance to wear which is the desired result in devices of this type having selected dimensions.

The precision of the resultant pitch is equivalent to that obtained with the best thread grinding machines, although the lathe used gives a thread precision meeting the requirements of the Salmon acceptance tests. Thus, for example, in the case of a helical bearing wherein after the initial machining operation on a lathe the pitch error or difference per meter was 0.05 mm., after five passages of the special nut of the helical bearing (according to the arrangement of FIG. 2) adjusted with a slight degree of prestress, the error was reduced to 0.03 mm. in one meter.

It was observed that the rolling and wear properties of the materials in the presence of the regularly distributed points of contact increased the useful life of the device, but it may also be observed that the device thus manufactured has a remarkable capacity of absorbing dynamic stress or "hunting."

In fact, the mechanical properties of the aforementioned steel used for manufacturing the screw and treated to obtain a strength of 140 to 150 kg./sq. mm. are as follows:

Elastic limit: 130 to 140 kg./sq. mm. resilience: 7 kgm./sq. cm.

Elongation: 9%.

By properly selecting the alloys and according to their metallurgical condition, the present method provides a marked increase in:

(1) Efficiency, due to the reduction in the friction between the two members operating under the best kinematic conditions contemplated in the study, these members being manufactured from materials having remarkable rolling properties;

(2) Resistance to wear and tear due to the uniform distribution of the points of contact on the threads of a screw made from a steel having a high elastic limit and a favorable elongation percentage in the races having a considerable resistance to wear, while preserving an exceptional safety margin in the case of dynamic interferences.

What I claim is:

1. Method of manufacturing a worm-and-nut device, wherein the worm threads contact at least one member such as a ball, a plain roller, or a threaded roller, said member transforming the greater part of the sliding frictional contacts into rolling contacts, which consists in utilizing for the worm an air-hardened steel, in machining the worm and subsequently burnishing said worm by cold working the worm threads by circulating throughout its length a nut assembly with controlled play, locked under a slight amount of prestress.

2. Method as set forth in claim 1, wherein said worm is made from steel having a composition comprised in the following range:

$C = 0.30$ to $0.45\%$
$Ni = 3.70$ to $4.30\%$
$Cr = 1.20$ to $1.50\%$
$Mo = 0.35$ to $0.60\%$
$Mn = 0.15$ to $0.55\%$
$Si = 0.10$ to $0.40\%$ treated to have a Vickers hardness number of $$420 \leqslant HV \leqslant 460$$

the hardness of the worm thread engaging member being $HV \geqslant 650$.

References Cited by the Examiner

UNITED STATES PATENTS

| 140,390 | 7/1873 | Stuart | 29—90 |
| 1,847,848 | 3/1932 | Ragan | 29—159.2 |
| 1,919,152 | 7/1933 | Wilkins | 29—90 |
| 1,960,841 | 5/1934 | Fellows | 29—90 |
| 2,040,347 | 5/1936 | Twyman | 29—90 |

FOREIGN PATENTS

| 98,202 | 7/1898 | Germany. |
| 151,183 | 9/1920 | Great Britain. |
| 494,481 | 10/1938 | Great Britain. |
| 253,763 | 3/1948 | Switzerland. |

WHITMORE A. WILTZ, *Primary Examiner.*

THOMAS H. EAGER, *Examiner.*